(12) United States Patent
Berkeley

(10) Patent No.: US 7,121,071 B2
(45) Date of Patent: Oct. 17, 2006

(54) REEL MOWER DISCHARGE SAFETY GUARD

(75) Inventor: James E. Berkeley, Pineville, NC (US)

(73) Assignee: Textron Inc., Providence, RI (US)

( * ) Notice: Subject to any disclaimer, the term of this patent is extended or adjusted under 35 U.S.C. 154(b) by 49 days.

(21) Appl. No.: 10/851,992

(22) Filed: May 21, 2004

(65) Prior Publication Data

US 2005/0257511 A1 Nov. 24, 2005

(51) Int. Cl.
*A01D 43/06* (2006.01)

(52) U.S. Cl. .............................. 56/202; 56/200; 56/249

(58) Field of Classification Search .................. 56/194, 56/198–200, 202–206, 320.2, 249
See application file for complete search history.

(56) References Cited

U.S. PATENT DOCUMENTS

| | | | | |
|---|---|---|---|---|
| 2,162,783 A | * | 6/1939 | Moyer | 56/14.7 |
| 2,861,411 A | | 11/1958 | Shock | |
| 3,186,152 A | | 6/1965 | Epstein | |
| 3,657,867 A | * | 4/1972 | Efflandt et al. | 56/17.2 |
| 3,721,078 A | * | 3/1973 | Haffner | 56/202 |
| 3,921,373 A | * | 11/1975 | Rubin | 56/16.6 |
| 4,238,918 A | * | 12/1980 | Saruhashi et al. | 114/116 |
| 4,964,266 A | * | 10/1990 | Kolb | 56/202 |
| 5,822,965 A | * | 10/1998 | Chesack et al. | 56/249 |
| 5,934,056 A | * | 8/1999 | McMurtry et al. | 56/203 |
| 6,910,324 B1 | * | 6/2005 | Kakuk | 56/255 |

FOREIGN PATENT DOCUMENTS

FR 2079040 11/1971

* cited by examiner

Primary Examiner—Thomas B. Will
Assistant Examiner—Alicia Torres
(74) Attorney, Agent, or Firm—Harness, Dickey & Pierce, P.L.C.

(57) ABSTRACT

A reel type mower having a mobile structure and a ground engaging traction member rotatably coupled to the mobile structure. The ground engaging traction member imparts traction movement to the mobile structure for movement on the ground at a ground speed. A power device is supported on the mobile structure and outputs a driving force to the ground engaging traction member. A bed knife is supported by the mobile structure having a cutting edge that cooperates with a grass cutting reel rotatably supported on the mobile structure. A collection apparatus is engagable with the mobile structure or removable from the mobile structure for collecting the grass clippings. A guard device is pivotally coupled to the mobile structure and is positionable in a closed position concealing the grass cutting reel and an opened position revealing the grass cutting reel. An actuation system drives the guard device into the closed position when the collection apparatus is removed from the mobile structure and drives the guard device into the opened position when the collection apparatus is engaged with the mobile structure.

9 Claims, 2 Drawing Sheets

REEL MOWER DISCHARGE SAFETY GUARD

FIELD OF THE INVENTION

The present invention relates to reel type mowers and, more particularly, relates to reel type mowers having a positionable discharge safety guard.

BACKGROUND OF THE INVENTION

Reel type mowers are well known in the art and provide many distinct cutting advantages over conventional rotary type mowers. In particular, the mechanical cooperation between the spinning reel blade assembly and the fixed blade serves to promote a desirable cut. The spinning reel blade assembly generally includes a plurality of blade members fixedly mounted on a horizontal axis for rotation therewith.

In operation, the grass, or other vegetation, is drawn between one of the plurality of blade members and the fixed blade to produce a cutting action. The cut grass is then discharged to the ground surface for decomposition (i.e. mulching mode) or to a catch basket for disposal (i.e. bagging mode). Traditionally, reel type mowers are configurable to operate in both mulching mode or bagging mode.

Although many reel type mowers have proven themselves safe and reliable over many years of service, recently there has been a renewed interest to provide additional safety features to ensure their continued safe operation. In the context of the aforementioned reel type mower, when operating in the bagging mode, operators empty the bagging component numerous times during mowing. During this emptying procedure, the engine may continue to run and, additionally, in some cases the plurality of blade members may continue to turn. Although the operator's hands are not typically near the plurality of blade members, it is desired to have additional protection to prevent operator error and accident.

Accordingly, there exists a need in the relevant art to provide a safety guard to prevent operator error from leading to an accident or injury when using a reel type mower. Furthermore, there exists a need in the relevant art to provide a safety guard for a reel type mower that may be easily configurable for use in a bagging mode and a mulching mode. Still further, there exists a need to overcome the disadvantages of the prior art.

SUMMARY OF THE INVENTION

According to the principles of the present invention, a reel type mower having an advantageous construction is provided. The reel type mower includes a mobile structure and a ground engaging traction member rotatably coupled to the mobile structure. The ground engaging traction member imparts traction movement to the mobile structure for movement on the ground at a ground speed. A power device is supported on the mobile structure and outputs a driving force to the ground engaging traction member. A bed knife is supported by the mobile structure having a cutting edge that cooperates with a grass cutting reel rotatably supported on the mobile structure. A collection apparatus is engagable with the mobile structure or removable from the mobile structure for collecting the grass clippings. A guard device is pivotally coupled to the mobile structure and is positionable in a closed position concealing the grass cutting reel and an opened position revealing the grass cutting reel. An actuation system drives the guard device into the closed position when the collection apparatus is removed from the mobile structure and drives the guard device into the opened position when the collection apparatus is engaged with the mobile structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
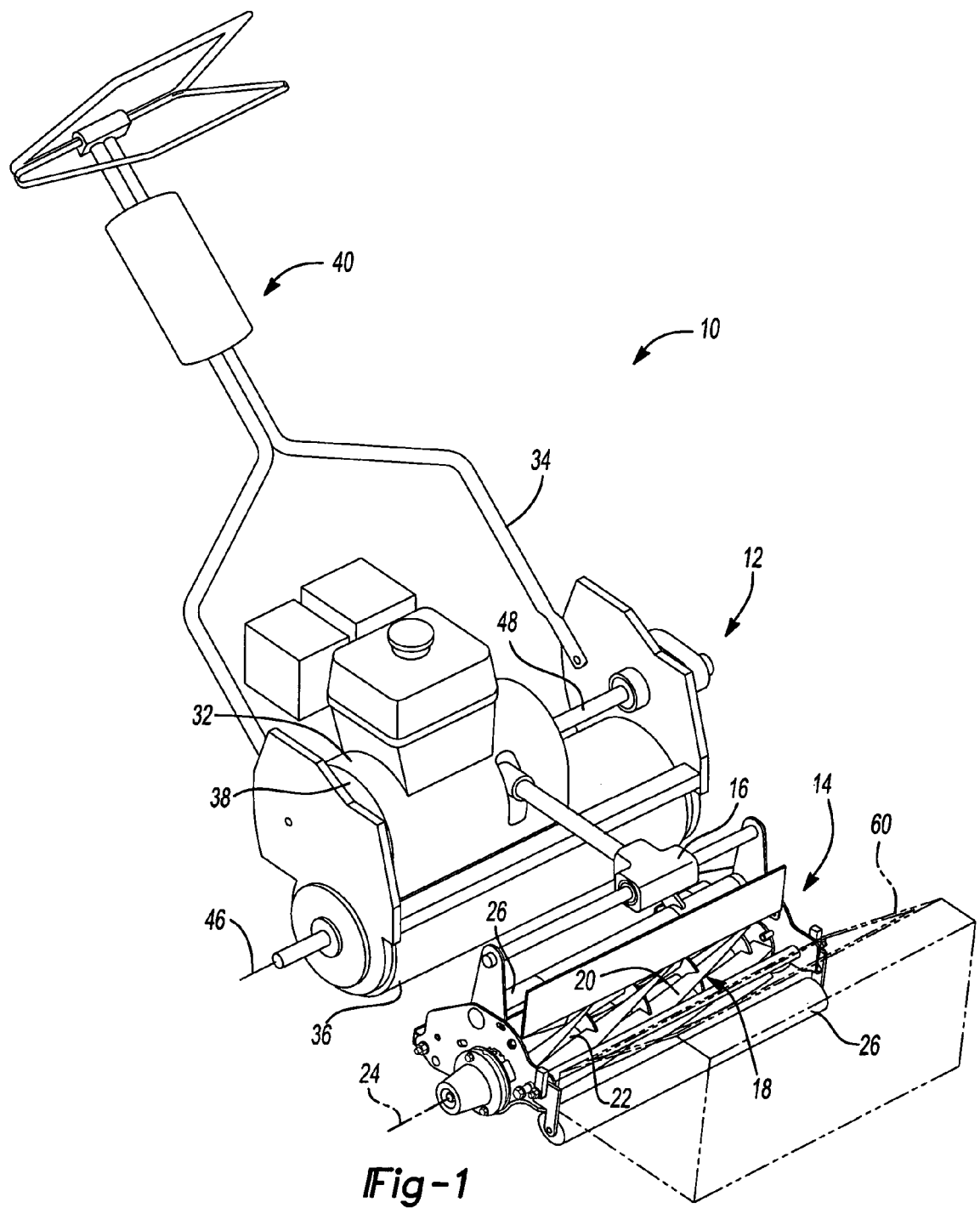
FIG. 1 is a perspective view illustrating a reel type mower according to the principles of the present invention.

With reference to the figures, FIG. 1 illustrates a greens mower 10 incorporating the principles of the present invention. Greens mower 10 is a reel-type mower having a base portion 12 and a floating or articulating mowing unit 14. Mowing unit 14 is articulately coupled to base portion 12 through a pivoting mechanism 16.

Figure 2:
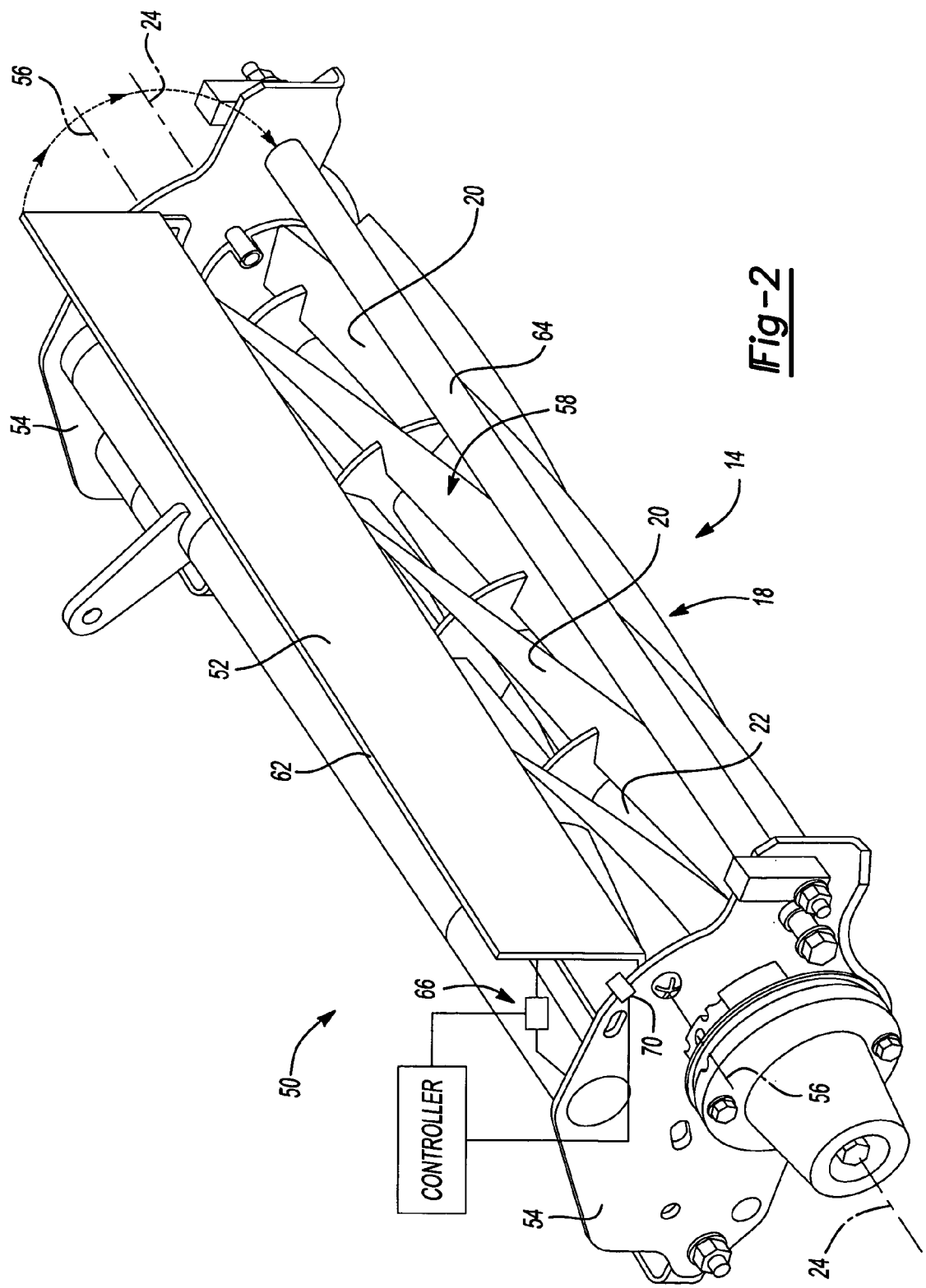
FIG. 2 is an enlarged perspective view illustrating the mowing unit of the present invention.

Mowing unit 14 includes a rotatable greens mower reel 18 having spiraled blades 20 equally spaced around a reel shaft 22. As best seen in FIG. 2, reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 (FIG. 1) rotatably mounted along a forward and rearward portion of mowing unit 14. The pair of ground engaging rollers 26 serve to support mowing unit 14 for movement on the ground. The pair of ground engaging rollers 26 are preferably adjustable to define a cutting height.

Base portion 12 generally includes an internal combustion engine 32, a frame 34, a lawn roller 36, a drive system 38, and a handle assembly 40. Internal combustion engine 32 is of conventional design and is mounted on frame 34.

Lawn roller 36 is rotatably mounted to frame 34 through a roller axle 46. Lawn roller 36 supports base portion 12 on the ground and serves as the traction drive for greens mower 10. Other ground-supporting traction members could be substituted. Drive system 38 is operably coupled between an output shaft 48 and lawn roller 36. Drive system 38 generally includes a drive pulley (not shown) mounted to output shaft 48 for rotation therewith and an idler pulley (not shown) mounted to lawn roller 36 for rotation therewith. A drive belt (not shown) extends between the drive pulley and the idler pulley to transfer drive force from internal combustion engine 32 to lawn roller 36. Thus, there exists a traction drive train from internal combustion engine 32 to the ground-engaging lawn roller 36 capable of driving greens mower 10 in at least a forward direction.

Still referring to FIG. 2, a safety guard device 50 is illustrated incorporated with mowing unit 14. Safety guard device 50 includes a flap device 52 that is hingedly mounted between side members 54 along an axis 56. Flap device 52 is positionable between a raised open position (see FIG. 2) and a lowered closed position. In the raised open position, flap device 52 pivots upward about hinge axis 56 to reveal a discharge opening 58. Discharge opening 58 permits the free discharge of grass clippings into a collection bag 60 (shown in phantom in FIG. 1). In the lowered closed position, a distal end 62 of flap device 52 contacts a support bar 64 extending between side members 54. In this lowered closed position, distal end 62 may rest upon support bar 64. In this lowered closed position, grass clippings will continue to be mulched and discharged out the bottom of mowing unit 14.

Still referring to FIG. 2, safety guard device 50 further includes an actuation system 66 is coupled between flap device 52 and, preferably, side member 54. Actuation system 66 is operable to position flap device 52 between the raised open position and the lowered closed position. Actuation system 66 may be any one of a number of different systems, including a hydraulic system wherein a hydraulic fluid actuates a hydraulic piston capable of extending and retracting so as to open and close flap device 52. Alternatively, actuation system 66 may be an electric solenoid system wherein a solenoid device is energized to open and close flap device 52. Still further, actuation system 66 may be a biasing member, such as a spring, that biases flap device 52 to a opened or closed position such that when collection bag 60 is removed, flap device 52 moves into the lowered closed position.

A switch 70 is further provided coupled to side member 54 of mowing unit 14. Switch 70 cooperates with collection bag 60 to provide a signal to activate actuation system 66. In the case of actuation system 66 having an electronic solenoid, switch 70 may simply be an electronic switch member that provides or cuts-off electrical power to the solenoid when triggered by the removal of collection bag 60, thereby moving flap device 52 into the lowered closed position. In the case of actuation system 66 being a hydraulic system, switch 70 may be an electrical or hydraulic switch capable of either establishing or preventing fluid communication with the hydraulic piston, thereby moving flap device 52 into the lowered closed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reel type mower comprising:
   a mobile structure;
   a ground engaging traction member rotatably coupled to said mobile structure, said ground engaging traction member imparting traction movement to said mobile structure for movement on the ground at a ground speed;
   a power device supported on said mobile structure, said power device outputting a driving force to said ground engaging traction member;
   a bed knife supported by said mobile structure having a cutting edge;
   a grass cutting reel rotatably supported on said mobile structure, said grass cutting reel having cutting blades being in grass cutting relationship with said bed knife producing grass clippings;
   a collection apparatus being engagable with said mobile structure or removable from said mobile structure, said collection apparatus collecting said grass clippings;
   a guard device pivotally coupled to said mobile structure, said guard device being positionable in a closed position concealing said grass cutting reel and an opened position revealing said grass cutting reel;
   an actuation system operably coupled between said guard device and said mobile structure, said actuation system driving said guard device into said closed position when said collection apparatus is removed from said mobile structure and driving said guard device into said opened position when said collection apparatus is engaged with said mobile structure; and
   a switch device operably coupled between said mobile structure and said collection apparatus, said switch device outputting a signal to said actuation system when said collection apparatus is engaged with said mobile structure.

2. The reel type mower according to claim 1 wherein said actuation system comprises:
   a hydraulic drive member operably coupled between said guard device and said mobile structure, said hydraulic drive member driving said guard device between said closed position and said opened position in response to said signal.

3. The reel type mower according to claim 1 wherein said actuation system comprises:
   a solenoid member operably coupled between said guard device and said mobile structure, said solenoid member driving said guard device between said closed position and said opened position in response to said signal.

4. A reel type mower comprising:
   a mobile structure;
   a ground engaging traction member rotatably coupled to said mobile structure, said ground engaging traction member imparting traction movement to said mobile structure for movement on the ground at a ground speed;
   a power device supported on said mobile structure, said power device outputting a driving force to said ground engaging traction member;
   a bed knife supported by said mobile structure having a cutting edge;
   a grass cutting reel rotatably supported on said mobile structure, said grass cutting reel having cutting blades being in grass cutting relationship with said bed knife producing grass clippings;
   a collection apparatus being engagable with said mobile structure or removable from said mobile structure, said collection apparatus collecting said grass clippings;
   a guard device pivotally coupled to said mobile structure, said guard device being positionable in a closed position concealing said grass cutting reel and an opened position revealing said grass cutting reel; and
   a hydraulic actuation system operably coupled between said guard device and said mobile structure, said hydraulic actuation system driving said guard device into said closed position when said collection apparatus is removed from said mobile structure and driving said guard device into said opened position when said collection apparatus is engaged with said mobile structure.

5. The reel type mower according to claim 4 further comprising:
a switch device operably coupled between said mobile structure and said collection apparatus, said switch device outputting a signal to said hydraulic actuation system when said collection apparatus is engaged with said mobile structure.

6. The reel type mower according to claim 4 wherein said guard device is a planar member pivotally coupled to said mobile structure.

7. A reel type mower comprising:
a mobile structure;
a ground engaging traction member rotatably coupled to said mobile structure, said ground engaging traction member imparting traction movement to said mobile structure for movement on the ground at a ground speed;
a power device supported on said mobile structure, said power device outputting a driving force to said ground engaging traction member;
a bed knife supported by said mobile structure having a cutting edge;
a grass cutting reel rotatably supported on said mobile structure, said grass cutting reel having cutting blades being in grass cutting relationship with said bed knife producing grass clippings;
a collection apparatus being engagable with said mobile structure or removable from said mobile structure, said collection apparatus collecting said grass clippings;
a guard device pivotally coupled to said mobile structure, said guard device being positionable in a closed position concealing said grass cutting reel and an opened position revealing said grass cutting reel; and
a solenoid actuation system operably coupled between said guard device and said mobile structure, said solenoid actuation system driving said guard device into said closed position when said collection apparatus is removed from said mobile structure and driving said guard device into said opened position when said collection apparatus is engaged with said mobile structure.

8. The reel type mower according to claim 7 further comprising:
a switch device operably coupled between said mobile structure and said collection apparatus, said switch device outputting a signal to said solenoid actuation system when said collection apparatus is engaged with said mobile structure.

9. The reel type mower according to claim 7 wherein said guard device is a planar member pivotally coupled to said mobile structure.

* * * * *